United States Patent [19]

Naito

[11] Patent Number: 5,628,900
[45] Date of Patent: May 13, 1997

[54] WATER PURIFIER HAVING A MAGNETIC FIELD GENERATION DEVICE

[76] Inventor: Harusuke Naito, 17-5, Haraojima 2-chome, Okayama-shi, Okayama-ken, Japan

[21] Appl. No.: 544,651

[22] Filed: Oct. 18, 1995

[51] Int. Cl.$^6$ .................................................. C02F 1/48
[52] U.S. Cl. ............................ 210/223; 210/287; 210/290
[58] Field of Search ........................................ 210/222, 223, 210/283, 287, 289, 503, 695, 748, 290

[56] References Cited

FOREIGN PATENT DOCUMENTS

200687  7/1992  Japan ........................... 210/223

*Primary Examiner*—Matthew O. Savage
*Attorney, Agent, or Firm*—Hedman, Gibson & Costigan, P.C.

[57] ABSTRACT

A water purifier includes a filter having a cylindrical housing formed with a water inlet at one end and a water outlet at the other end and contains in the housing a ceramic layer consisting of granular ceramic heaped up in a layer, a magnetite layer consisting of broken pieces of magnetite heaped up in a layer and provided at least above or below the ceramic layer, and annular magnets provided above and below the ceramic layer in such a manner that these annular magnets coincide with each other in the sense of magnetic lines of force and that the direction of the magnetic lines of force is parallel to the direction of flow of water. Water molecules are activated while passing through the magnetic field produced by the annular magnets and the magnetite layers which are magnetized by the annular magnets.

1 Claim, 8 Drawing Sheets

WATER PURIFIER HAVING A MAGNETIC FIELD GENERATION DEVICE

BACKGROUND OF THE INVENTION

This invention relates to a water purifier and, more particularly, to a water purifier having a magnetic field generation device such as a permanent magnet.

Known in the art of devices for purifying tap water are devices which utilize active carbon etc. to remove residual chlorine and other impurities in tap water, devices which have an additional function of adjusting the water quality such as pH by an electrolytic treatment or by using an ion exchange resin and also recently developed devices which utilize an infrared ray irradiation or a magnetization treatement to activate water molecules.

Japanese Utility Model Registration No. 3003275 discloses a water purifier including a filter having a cylindrical housing formed with a water inlet at one end and a water outlet on the other and containing an active carbon layer and layers of other materials in which magnet plates each having three permanent magnets are provided above and below a layer of granular ceramic in such a manner that the sense of magnetic lines of force of these magnets coincide with one another, the sense of the magnetic lines of of force of these magnets is opposite to the direction of flow of water and the direction of the magnetic lines of force of these magnets is parallel to the direction of flow of water.

Figure 9:
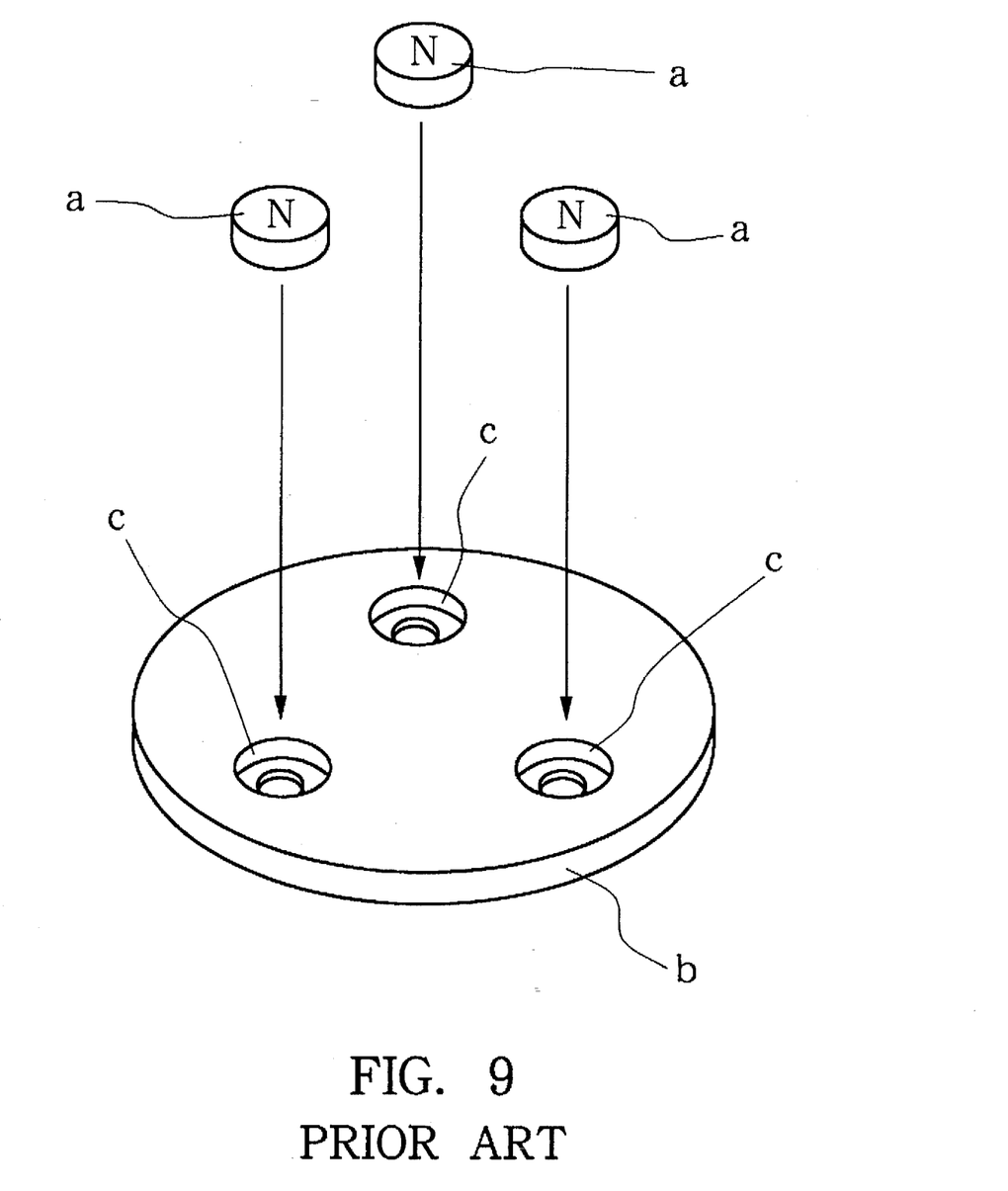
FIG. 9 is a view showing magnets having the shape of a coin used in the prior art water purifier.

In this prior art water purifier, as shown in FIG. 9, each of the magnet plates include three magnets a in the shape of a coin received in three magnet receiving recesses c formed in a spacer b consisting of a plastic disk which is formed with a multiplicity of small water passing perforations (not shown). The three magnets are disposed at positions on a circle concentrical with the center axis of the housing at an interval of 120 degrees with respect to the center of the circle. These magnets a are coated with resin and have residual flux of residual flux of 12,000 gauss and are magnetized in the axial direction.

It is an object of the present invention to provide an improved water purifier capable of applying a magnetic field to water to be treated more effectively than the above described prior art water purifier and thereby removing residual chlorine in water to be treated more effectively.

SUMMARY OF THE INVENTION

Laborious studies and experiments conducted by the inventors of the present invention for achieving the above described object have resulted in a finding, which has led to the present invention, that, by providing a magnetite layer at least above or below a layer of granular ceramic and selecting an annular permanent magnet as a magnetic field generation device which is disposed at a position at which it can magnetize the magnetite layer, the concentration of residual chlorine in water to be treated is unexpectedly reduced to a much greater degree than by the prior art water purifier in which the magnets having the shape of a coin provided in a spacer notwithstanding the fact that residual flux of of the magnets of the water purifier of the present invention is smaller (i.e., the magnetic field strength is weaker) than residual flux of the magnets of the prior art water purifier.

For achieving the above described object of the invention, there is provided a water purifier comprising a filter having a cylindrical housing formed with a water inlet at one end and a water outlet at the other end and containing in the housing a ceramic layer consisting of granular ceramic heaped up in a layer, a magnetite layer consisting of broken pieces of magnetite heaped up in a layer and provided at least above or below the ceramic layer, and annular magnets provided above and below the ceramic layer in such a manner that these annular magnets coincide with each other in the sense of magnetic lines of force and that the direction of the magnetic lines of force is parallel to the direction of flow of water.

According to the invention, by selecting annular magnets as the magnetic field generation device magnetizing the magnetite layer provided above and/or below the ceramic layer, residual chlorine in water to be treated can be removed more effectively than by the prior art water purifier.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
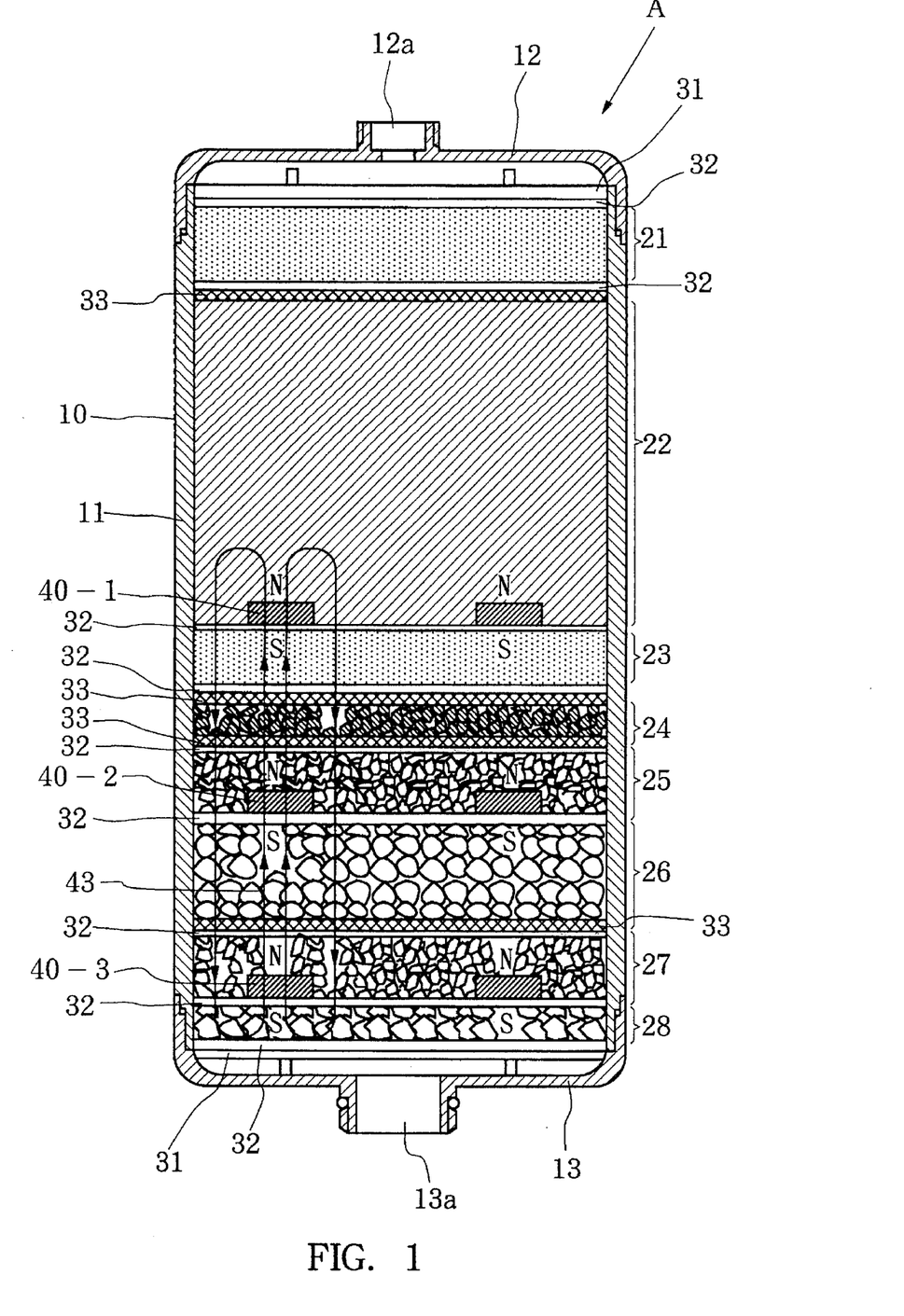
FIG. 1 is a vertical sectional view showing a filter of an embodiment of the invention.

FIG. 1 shows an embodiment of the invention. FIG. 1 is a vertical sectional view of a filter A which constitutes an essential part of the water purifier. The filter A includes a housing 10, a first sand layer 21, an active carbon layer 22, a second sand layer 23, a bakuhanseki layer 24, a first magnetite layer 25, a ceramic layer 26, a second magnetite layer 27, a taichoseki layer 28, porous filter plates 31, non-woven fabric layers 32, partition nets 33 and annular magnet plates 40-1, 40-2 and 40-3.

The housing 10 includes a cylindrical main body 11, a cap 12 having a water inlet 12a and being fitted on the upper end portion of the main body 11 and a cap 13 having a water outlet 13a and being fitted on the lower end portion of the main body 11.

The first and second sand layers 21 and 23 consist of white sands made by treating eruptive rock in a special manner and heaped in a layer. The active carbon layer 22 consists of granular active carbon heaped up in a layer. These layers perform the function of removing residual chlorine, organic materials, harmful materials such as trihalomethane, red rust, impurities, mold etc. The first natural ceramics layer 24 and the second natural ceramics layer 28 consist of finely broken pieces of natural ceramics such as quartz porphyry respectively heaped up in a layer and perform the function of adjusting the water quality including pH and supplying minerals to the water.

The first and second magnetite layers 25 and 27 consist of finely broken pieces of magnetite heaped up in a layer. These magnetite layers 25 and 27 are magnetized by the magnetic field produced by annular magnets 40-1 to 40-3 to be described later and serve to remove heavy metals and activate water molecules by magnetization of these magnetite layers. It is known that activation of water molecules is at the maximum in a case where the direction of magnetic line of force is at an angle of 45 degrees or 90 degrees with respect to the direction of flow of water. Since magnetic lines of force are produced substantially in all directions from the broken pieces of the magnetized magnetite layers 25 and 27, water molecules passing through the magnetized magnetite layers 25 and 27 are significantly activated. The ceramic layer 26 consist of granular ceramic heaped up in a layer. This ceramic is obtained by treating white sands made from eruptive rock at a high temperature (e.g., 1100° C.). The ceramic layer 26 serves as a condenser and facilitates forming of magnetic flux. If infrared ray is irradiated through the ceramic layer 26, water molecules are further activated and deterioration of the water quality is thereby prevented.

The porous filter plates 31 are made of plastic plates formed with a multiplicity of small perforations. These porous filter plates 31, the non-woven fabric filters 32 and the partition nets 32 separate and hold the above described respective layers.

The filter A is made by providing in the main body 11 of the housing 10 the above described layers, filters and plates 31, 32, 21, 32, 33, 22, 40-1, 32, 23, 32, 33, 24, 33, 32, 25, 40-2, 32, 26, 33, 32, 27, 40-3, 32, 28, 32 and 31 from the upper portion to the lower portion of the main body 11 in the order described. In this structure, the annular magnets 40-1, 40-2 and 40-3 are provided in such a manner that these magnets 40-1, 40-2 and 40-3 are disposed in parallel with the interval between the annular magnet 40-1 and the annular magnet 40-2 being substantially equal to the interval between the annular magnet 40-2 and the annular magnet 40-3 and that the respective annular magnets 40-1, 40-2 and 40-3 coincide in the sense of the magnetic lines of force with one another so that the sense of the magnetic lines of force of these magnets is opposite to the direction of flow of water and that the direction of the magnetic lines of force of these magnets is parallel to the direction of flow of water.

The magnetic lines of force of these annular magnets 40-1 to 40-3 are combined together to form a substantially uniform and strong magnetic field 43 which is parallel to the direction of flow of water and is of an opposite sense to the direction of the flow of water. Since the magnetic field 43 strongly magnetizes the first magnetite layer 25 and the second magnetite layer 27, water molecules are activated when water flows through the layers between the magnet 40-1 and the magnet 40-3, particularly the first and second magnetite layers 25 and 27. Since the magnetic field 43 formed by the first and second magnetite layers 25 and 27 pass through the ceramic layer 26, water molecules are further activated through the ceramic layer 26. Activation of water molecules will be further enhanced if infrared ray is irradiated through the ceramic layer 25 in the known manner.

Figure 2:
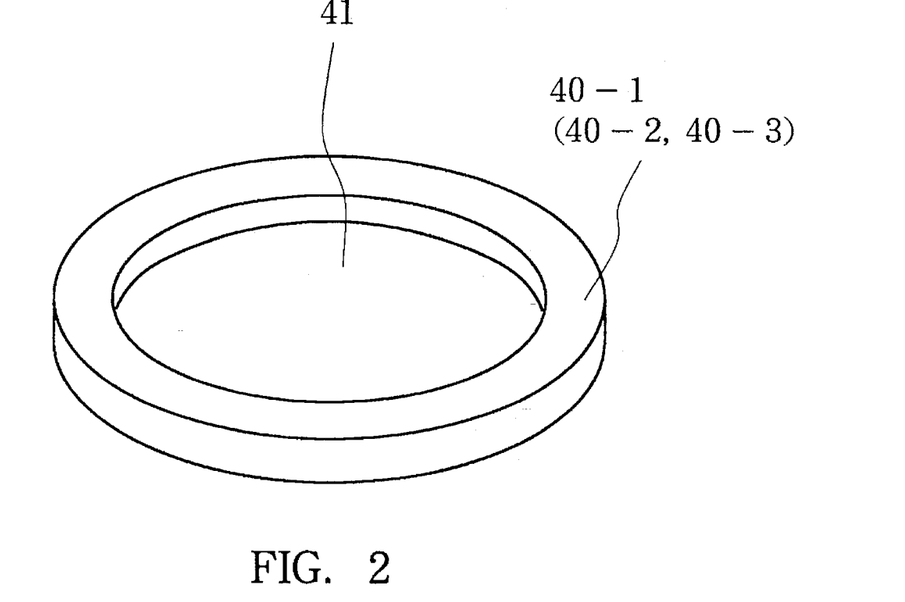
FIG. 2 is a perspective view showing an example of an annular magnet used in the filter of the water purifier of the present invention.

The annular magnets 40-1, 40-2 and 40-3 are made in the form a disk formed with a central opening 41 as shown in FIG. 2. Its outer diameter, inner diameter and thickness of each annular magnet are set to proper values having regard to factors such as the size of the housing 10, necessary strength of the magnetic field and necessary amount of water to be treated per unit time.

Figure 3:
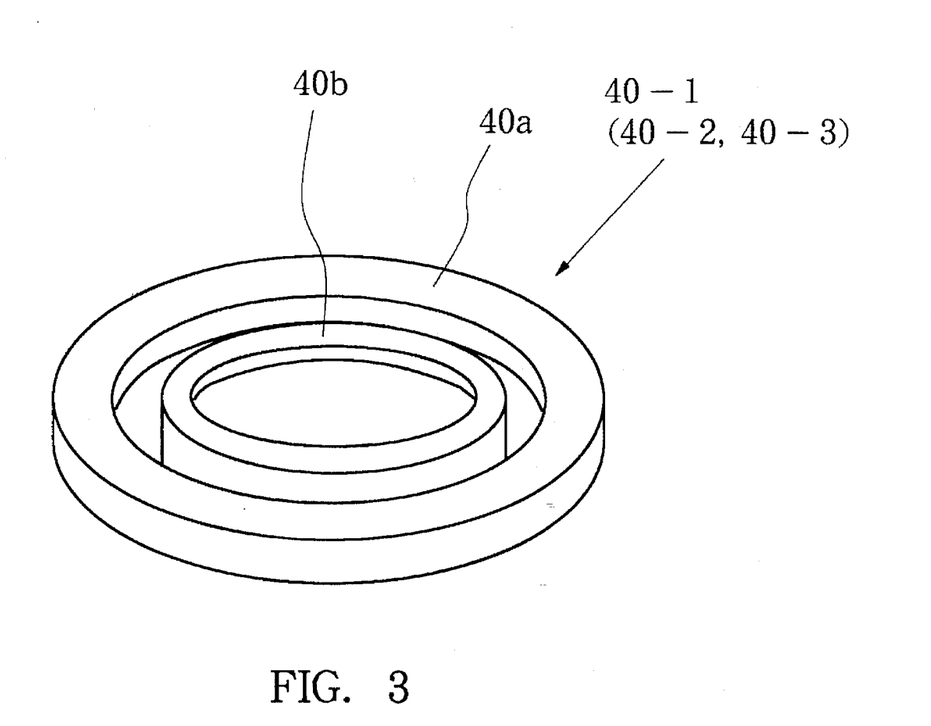
FIG. 3 is a perspective view showing another example of an annular magnet.
Figure 7:
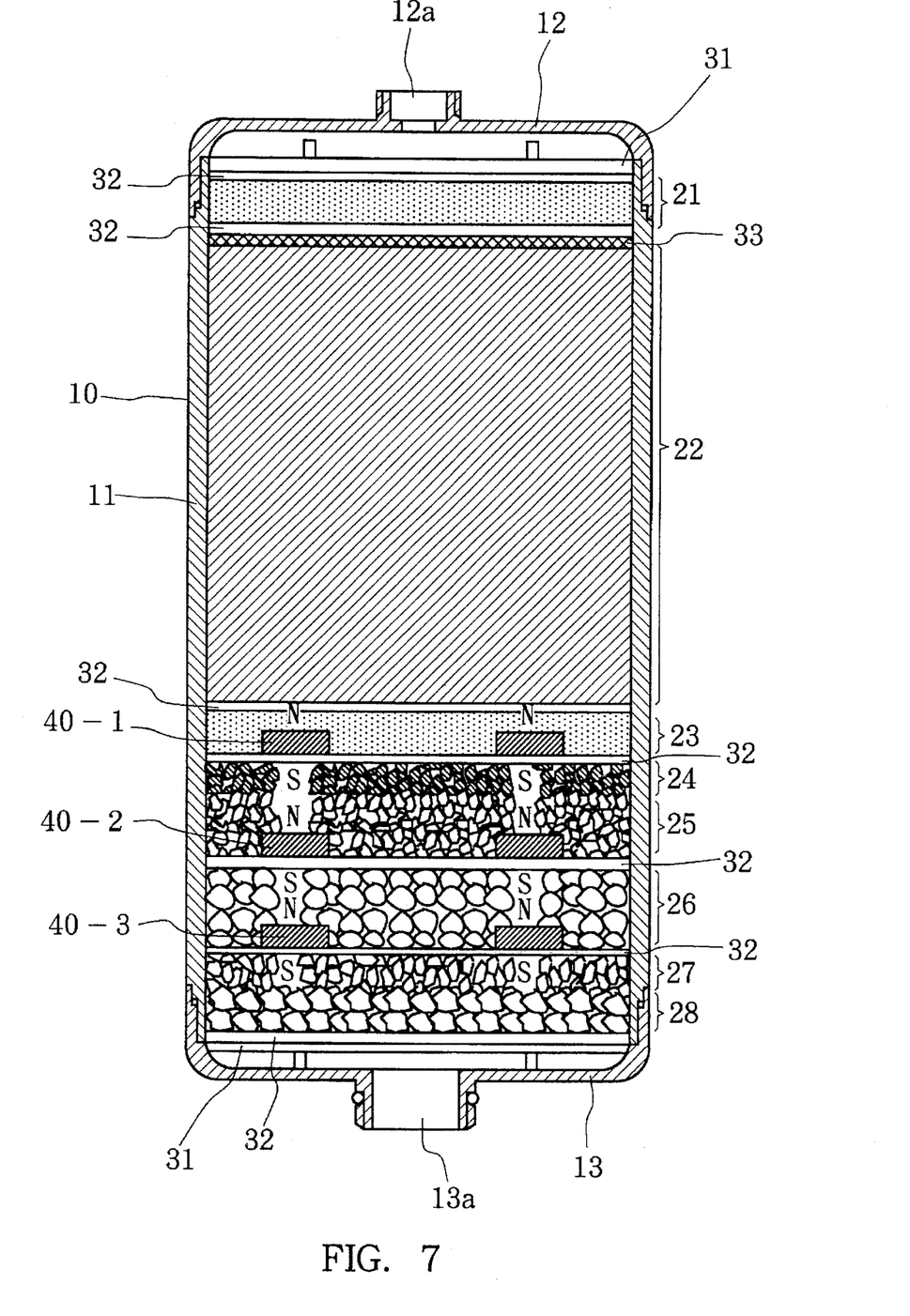
FIG. 7 is a vertical sectional view of another example of a filter used in the water purifier according to the invention.
Figure 8:
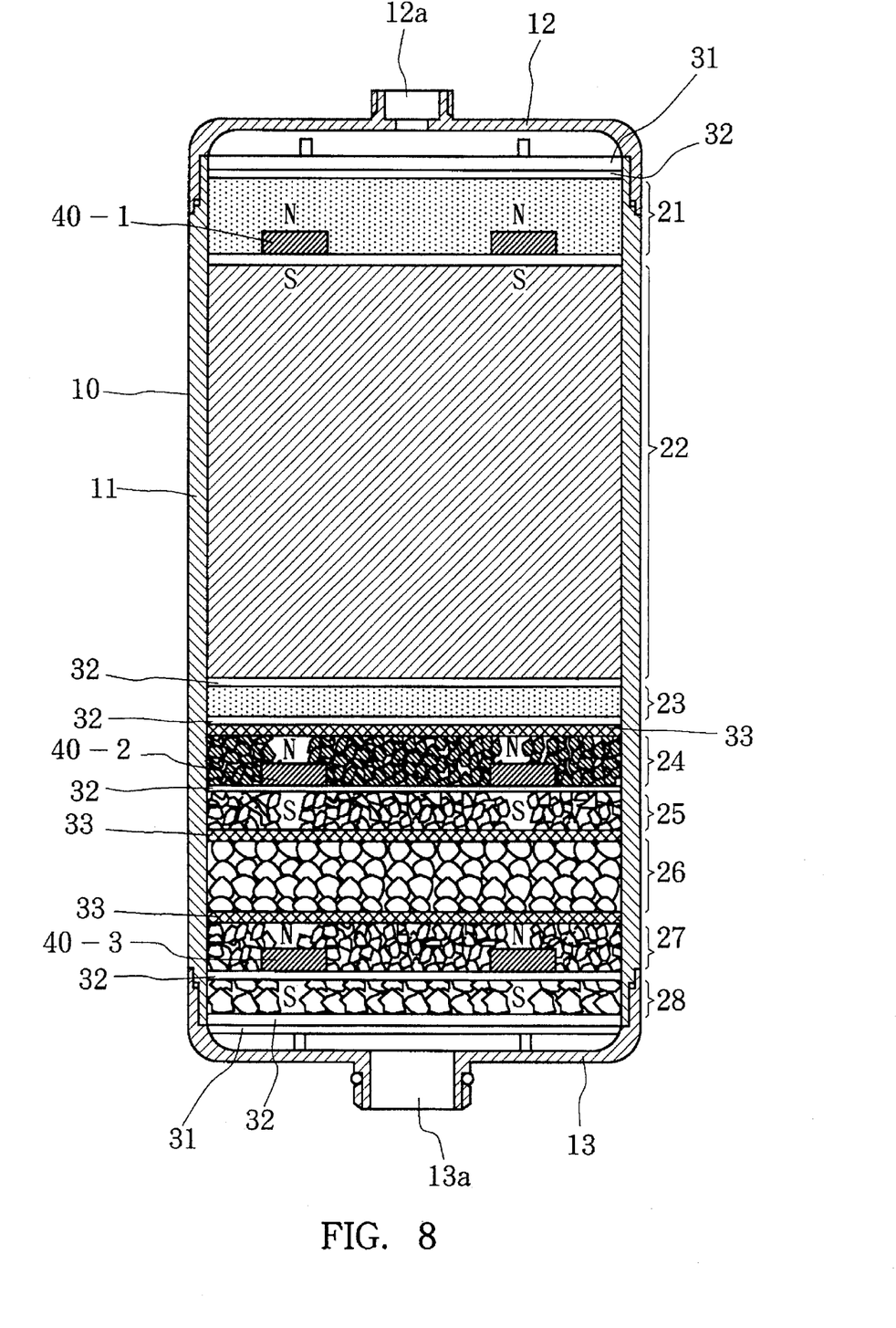
FIG. 8 is a vertical sectional view of another example of a filter used in the water purifier according to the invention.

In the present embodiment and embodiments shown in FIGS. 7 and 8, the single annular magnet shown in FIG. 2 is used as the respective annular magnets 40-1, 40-2 and 40-3. Alternatively, the annular magnets 40-1, 40-2 and 40-3 may be respectively composed of concentrically disposed large and small annular magnets 40a and 40b as shown in FIG. 3.

Figure 4:
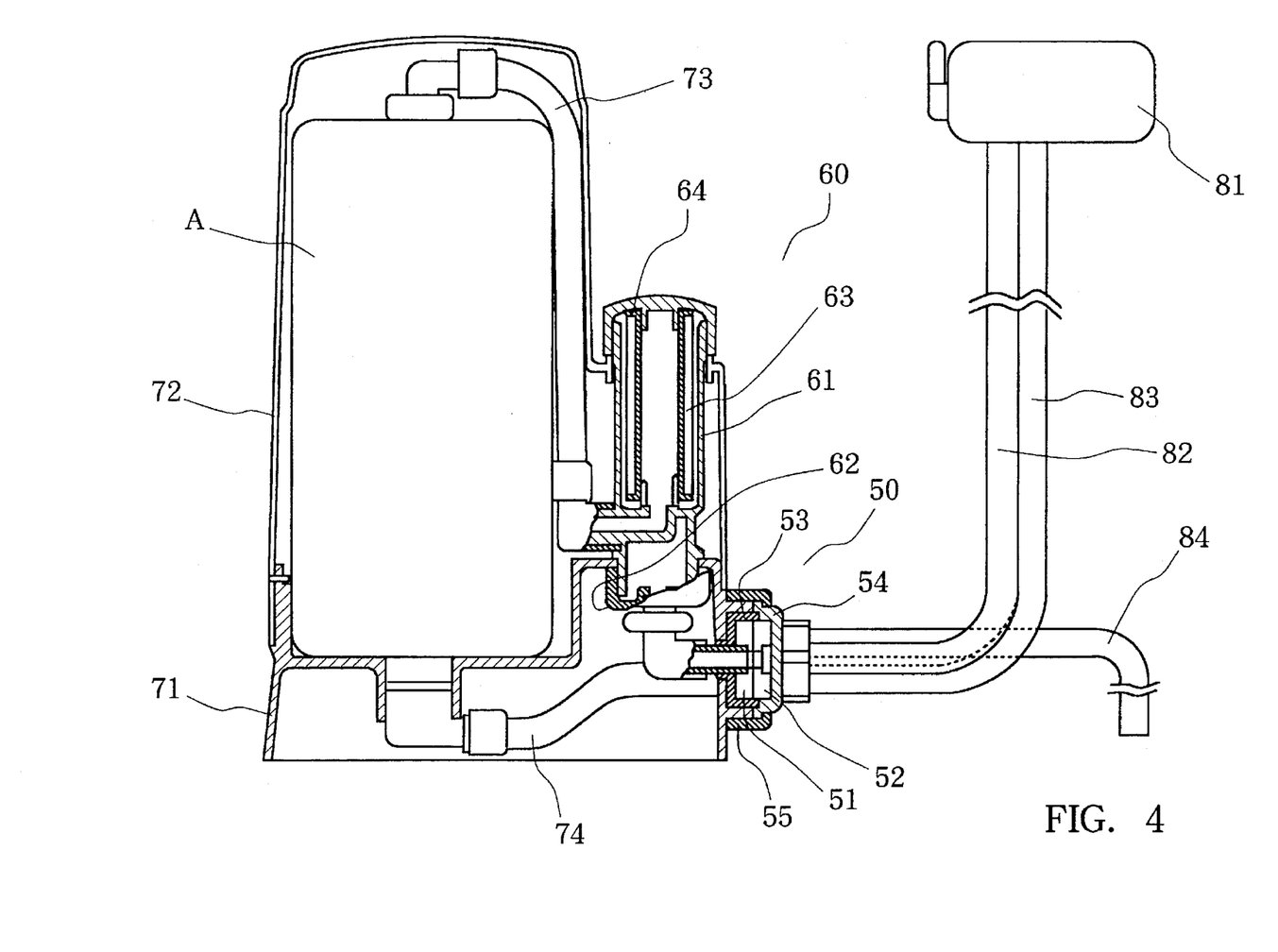
FIG. 4 is a view showing the structure of the entire water purifier of the above embodiment.

FIG. 4 shows an example of a water purifier incorporating the filter A shown in FIG. 1. In the figure, reference character A designates the filter device shown in FIG. 1, 50 a switch, 60 a prefilter, 71 a base, 72 a cover, 73 and 74 connecting hoses, 81 a connector to a water tap, and 82, 83 and 84 hoses, respectively.

The switch 50 includes ceramic disks 51 and 52, a holder 53 for holding the disk 51 fixedly against a base plate 71, a rotary holder 54 for holding the disk 52 integrally therewith and a nut 55 which rotatably holds the plate 52 and the rotary holder 54 against the base 71.

Figure 5A:
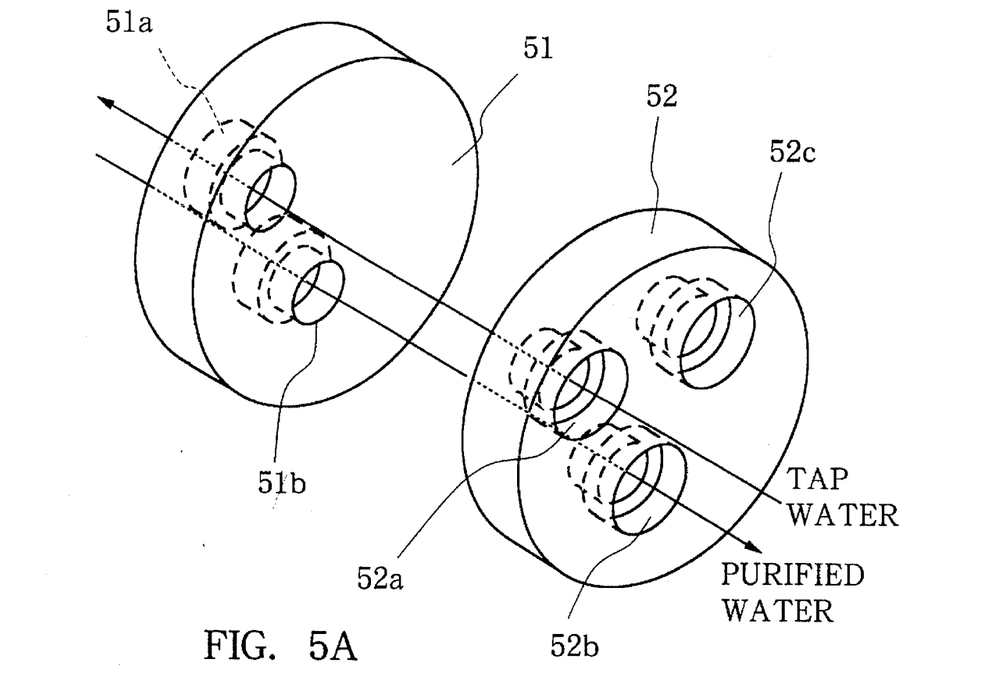
FIGS. 5A and 5B are exploded perspective views showing operations of a switch in the water supply mode and the backwashing mode.
Figure 5B:
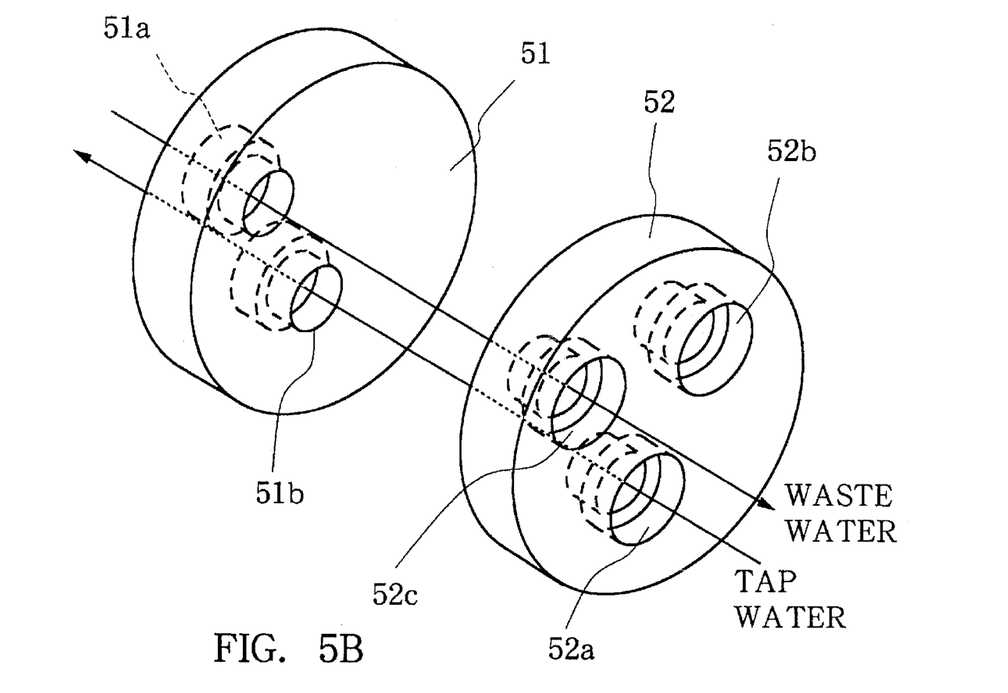

FIGS. 5A and 5B show the operation of the switch 50 in a water supply mode and a backwashing mode with the disk 51 being separated from the disk 52. In the actual structure of the switch 50, the disk 51 is held closely to the disk 52. The disk 51 has first and second openings 51a and 51b on a circle concentrical with the disk 51 and the disk 52 has first, second and third openings 52a, 52b and 52c concentric with the disk 52. The openings 51a and 51b are apart from each other by an angle of 120 degrees with respect to the center of the disk 51 and the openings 52a, 52b and 52c are apart from one another by an angle of 120 degrees with respect to the center of the disk 52. By rotating the disk 52 with the rotary holder 54, these openings assume either the first position shown in FIG. 5A in which the opening 51a opposes the opening 52a and the opening 51b opposes the opening 52b or the second position shown in FIG. 5B in which the opening 51a opposes the opening 52c and the opening 51b opposes the opening 52a.

The first opening 51a of the disk 51 is connected to the water inlet of the filter container A through a prefilter 60 and a connecting hose 73 and the second opening 51b is connected to the water outlet of the filter A through a connecting hose 74.

The first opening 52a of the disk 52 is connected to a hose 82, the second opening 52b is connected to a hose 83 and the third opening 52c is connected to a hose 84.

The prefilter 60 includes a cylindrical filter case 61, a cap 62 which connects the prefilter 60 fixedly to the base 71, a cylindrical filter main body 63 and a cap 64 used when the filter main body 63 is replaced. In a normal water supply mode, water flowing from the lower end of the filter case 81 passes from the outside to the inside of the filter main body 63 and flows into the filter container A through the connecting hose 73.

The connector 81 is connected to a water tap (not shown) to supply either water to be treated (e.g., tap water) or water which has been treated as desired. The connector 81 can supply water to be treated to the switch 50 through the hose 82 or receive water which has been treated from the switch 50 through the hose 83.

Figure 6A:
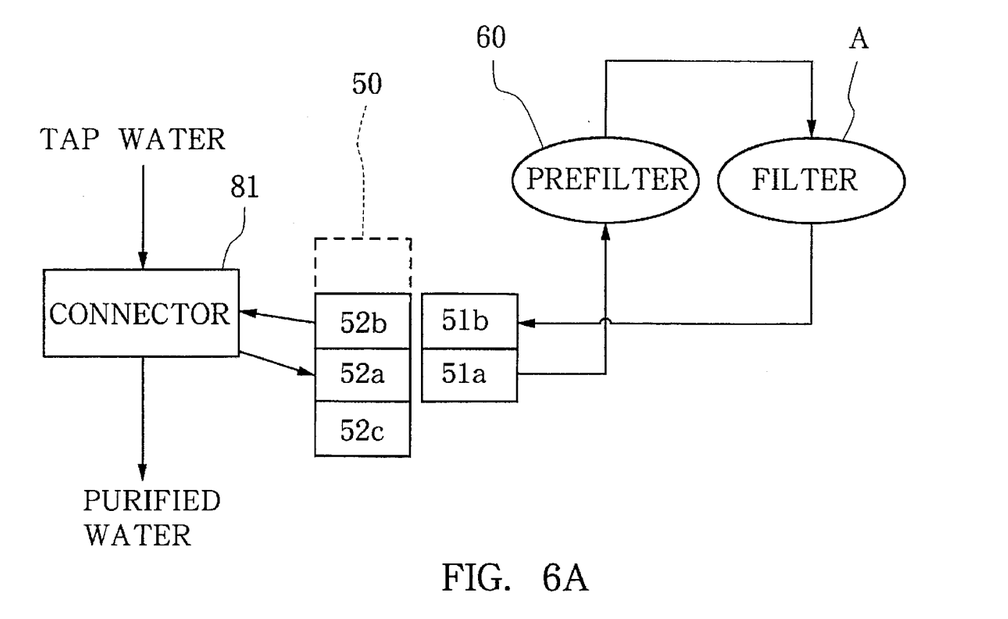
FIGS. 6A and 6B are diagrams illustrating flow of water in the water supply mode and the backwashing mode.
Figure 6B:
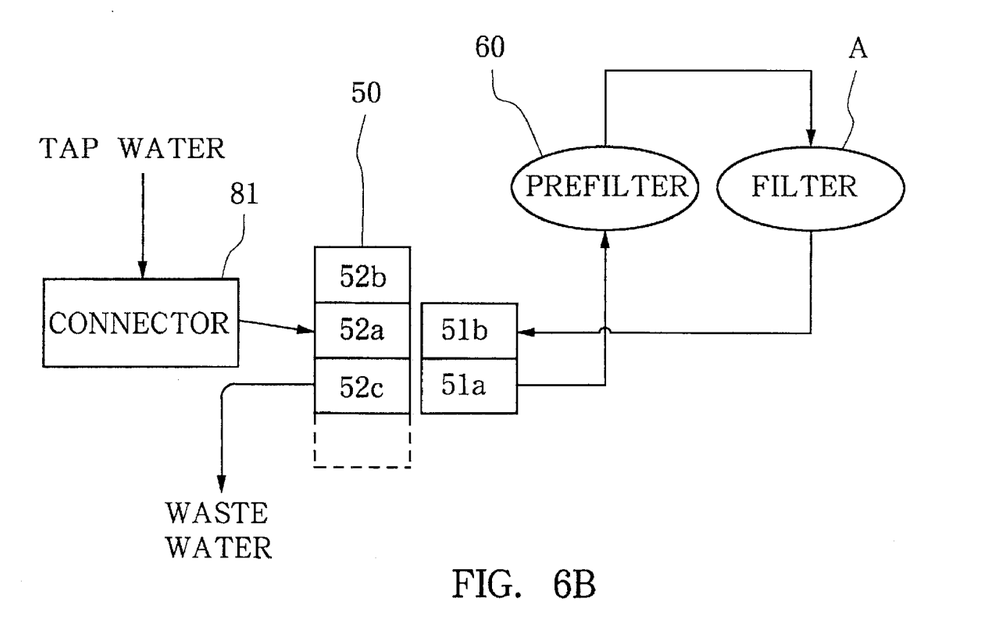

FIGS. 6A and 6B schematically show flow of water in the water supply mode and the backwashing mode. The operation of the device will now be described with respect to FIGS. 4, 5A, 5B and 6A, 6B.

Let us assume now that the disks 51 and 52 of the switch 50 are in the water supply mode shown in FIG. 5A in which tap water which has been treated by the filter A is supplied from the connector 81 to the water tap. In this mode, tap water to be treated reaches the switch 50 from the fitting 81 through the hose 82 and reaches the prefilter 60 from the opening 52a of the disk 52 through the opening 51a of the disk 51. In the prefilter 60, relatively large particles of dust etc. are removed in the filter main body 63 and water to be treated reaches the water inlet of the filter A through the connecting hose 73. The water to be treated then is purified and activated in the filter A in the above described manner. Water which has been thus treated reaches the switch 50 through the water outlet and connecting hose 74 and further reaches the connector 81 through the opening 51b of the disk 51, the opening 52b of the disk 52 and the hose 83.

Then, assume a case where the holder 54 of the switch 50 is rotated counterclockwise by 120 degrees from the water supply mode shown in FIG. 5A. The disks 51 and 52 are now brought into the backwashing mode shown in FIG. 5B. In this mode, untreated tap water reaches the switch 50 from the connector 81 to the water tap through the hose 82 in the same manner as in FIG. 5A but water then reaches the water outlet of the filter A through the opening 52a of the disk 52, the opening 51b of the disk 51 and the connecting hose 74. Water then flows through the filter A reversely from the water outlet thereof to remove small particles which block the respective layers and nonwoven filter and clean them. Water then reaches the prefilter 60 through the water inlet and the connecting hose 73 and cleans the prefilter 60. The waste water then is removed through the switch 50, the opening 51a of the disk 51, the opening 52c of the disk 52 and the hose 84.

After completion of backwashing, the holder 54 of the switch 50 is rotated clockwise by 120 degrees and the disks 51 and 52 are brought to the water supply mode shown in FIG. 5A. It will be apparent that, when the connector 81 is in the position for supplying tap water directly, tap water is not supplied to the side of the switch 50 regardless of the condition of the switch 50.

The filter main body 63 of the prefilter 60 is expected to become dirty to a greater extent than the other portion of the device and, for this reason, the filter main body 63 may be previously removed when backwashing is performed. The filter main body 63 can be easily removed by detaching the cap 64 and can be rinsed or replaced by a new filter main body and, therefore, no particular inconvenience takes place by removing the filter main body 63 before backwashing.

According to the above described structure, the flow of water in the filter A and the prefilter 60 can be turned reversely by mere rotation of the holder 54 of the switch 50 by 120 degrees. Therefore, blocking water channels of the filter A and the prefilter 60 can be eliminated and the component parts of the filter A and the prefilter 60 can be cleaned without the necessity for detaching and reconnecting the hoses. In backwashing, waste water is removed from the third hose 83 which is not usually used and this ensures safety from the sanitary point of view.

FIG. 7 shows a filter of another embodiment of the invention. In FIG. 7, the same component parts as those in FIG. 1 are designated by the same reference characters and description thereof will be omitted.

This embodiment is basically similar to the embodiment shown in FIG. 1 except that the thickness of the active carbon layer 22 is about half of the entire height of the housing, that the annular magnet 40-1 is disposed between the second sand layer 23 and the bakuhanseki layer 24 and that the annular magnet 40-3 is disposed between the ceramic layer 26 and the second magnetite layer 27.

According to this embodiment, residual chlorine, organic materials, harmful materials, red rust, impurities and mold can be removed effectively by virtue of the thicker active carbon layer 22. Besides, a stronger magnetic field can be formed by shortening of the interval between the annular magnets 40-1 and 40-2 and activation of water molecules by such magnetic field and also by a magnetic field formed by the first and second magnetite layers 25 and 27 is enhanced and activation of water molecules is also enhanced if irradiation of infrared lay through the ceramic layer 25 is performed.

FIG. 8 shows a filter of another embodiment of the invention. This embodiment is basically similar to the embodiment of FIG. 1 except that the thickness of the active carbon layer 25 is about half of the height of the housing, that the annular magnet 40-1 is disposed between the first sand layer 21 and the active carbon layer 22 and that the annular magnet 40-2 is disposed between the bakuhanseki layer 24 and the first magnetite layer 25.

According to this embodiment, residual chlorine etc. can be effectively removed by virtue of the thicker active carbon layer 22 and, further, since the annular magnet 40-1 is disposed in the upper portion of the filter A, a uniform magnetic field is formed through the entire filter A is formed and, accordingly, treatment of water molecules can be performed by this magnetic field in the entire filter A.

Experiments have been conducted for comparing the effect of removing residual chlorine in tap water by the water purifier using the annular magnets according to the invention with the effect of removing residual chlorine by the prior art water purifier using the magnets shown in FIG. 9.

In these experiments, the filter of the embodiment shown in FIG. 8 was used. The housing 10 of the filter used had a height of 261 mm and an inner diameter of 106 mm and the respective layers shown in FIG. 8 were provided in the housing 10. As the annular magnets 40-1, 40-2 and 40-3, annular magnets each being made of ferrite and having an outer diameter of 80.4 mm, inner diameter of 39.8 mm and thickness of 8 mm were used. These annular magnets 40-1, 40-2 and 40-3 produced residual flux of 4,500 gauss.

Tap water of the city of Okayama, Japan was passed continuously through this water purifier and oxidation reduction potential (ORP) of treated water was measured. It is generally believed that the ORP value is reduced as the concentration of residual chlorine in water is reduced. In this measurement, the oxidation reduction potential meter HM11P produced by Toa Denpa Kogyo K.K. was used and the ORP value was obtained by adding reference electrode potential of 206 mV at the water temperature 25° C. to an ORP value obtained by the oxidation reduction potential meter. According to the experiment, the ORP value of the untreated tap water was 866 mV and the ORP value of the tap water after the treatment by the water purifier dropped to 586 mV.

For comparison, the same tap water was passed through a water purifier which was of the same construction as the above described water purifier except that the annular magnets 40-1, 40-2 and 40-3 were replaced by the magnets shown in FIG. 9 and the ORP value of tap water after treatment by this water purifier was measured under the same measurement conditions as described above. As the magnets of FIG. 9 constituting the respective magnet layers, three magnets made of neodymium and having the shape of a coin each having a diameter of 23.5 mm and a thickness of 3.4 mm were disposed in the magnet receiving recesses of a spacer at an interval of 120 degrees with respect to the center of the spacer. Residual flux of the magnets was 12,000 gauss. As a result of experiments, the ORP value of the tap water after treatment by this water purifier using the magnets of FIG. 9 dropped to 656 mV.

The comparative experiments shows that the water purifier made according to the invention exhibits a superior oxidation reduction potential reduction effect, that is, a superior residual chlorine removal effect, compared with the prior art water purifier using the coin shaped magnets notwithstanding the fact that the prior art water purifier has a much stronger magnetic field than the water purifier of the present invention.

The arrangement of the respective layers is not limited to the above described embodiment. For example, the filter may be composed of a first annular magnet, a first magnetite layer, a ceramic layer, a second magnetite layer and a second annular magnet disposed in the order described from the top layer to the bottom layer or may be composed of repetition of such combination of layers. It is, however, preferable that a magnetite layer should be provided at least on the upper side or the lower side of the ceramic layer.

What is claimed is:

1. A water purifier comprising:

a cylindrical housing defining a cylindrical chamber and having a central longitudinal axis and a pair of opposite ends spaced along said axis, said housing being formed with a water inlet at said one end and a water outlet at said other end to allow a flow of water through said chamber in a direction parallel to said longitudinal axis;

a filter disposed in said chamber adjacent said inlet;

a ceramic layer disposed in said chamber between said filter and said outlet, said ceramic layer consisting of granular ceramic heaped up in a layer and extending perpendicularly across said chamber relative to said axis;

a pair of magnetite layers disposed in said chamber, each said magnetite layer consisting of a layer of broken pieces of magnetite extending perpendicularly across said chamber relative to said axis, wherein one of said magnetite layers is disposed between said filter and said ceramic layer and the other of said magnetite layers is disposed between said ceramic layer and said outlet; and, a pair of annular-magnets disposed in said chamber and coaxially surrounding said axis, wherein one of said magnets is located between said ceramic layer and said inlet and the other of said magnets is located between said ceramic layer and said outlet such that said annular magnets generate magnetic lines of force which are parallel to said central longitudinal axis and the direction of said flow of water, said annular magnets being located in relation to said magnetite layers in such a manner that said magnetic lines of force pass through said magnetite layers and thereby magnetize said magnetite layers.

* * * * *